(12) United States Patent
Collins (10) Patent No.: US 7,984,698 B1
(45) Date of Patent: Jul. 26, 2011

(54) PET TETHER APPARATUS

(76) Inventor: Jon Edward Collins, Menifee, CA (US)

( * ) Notice: Subject to any disclaimer, the term of this patent is extended or adjusted under 35 U.S.C. 154(b) by 156 days.

(21) Appl. No.: 12/203,922

(22) Filed: Sep. 4, 2008

(51) Int. Cl.
*A01K 3/00* (2006.01)
(52) U.S. Cl. ........................................ 119/780; 119/787
(58) Field of Classification Search ................. 119/769, 119/770, 780, 786–789, 795–798; 43/24
See application file for complete search history.

(56) References Cited

U.S. PATENT DOCUMENTS

| | | | | |
|---|---|---|---|---|
| 68,906 A | * | 9/1867 | Flanders | 119/780 |
| 157,530 A | * | 12/1874 | McAfee | 119/780 |
| 244,843 A | * | 7/1881 | Battelle | 119/780 |
| 374,646 A | * | 12/1887 | Adams | 119/780 |
| 1,181,881 A | * | 5/1916 | Hausz | 119/780 |
| 2,231,053 A | * | 2/1941 | Byrd | 43/24 |
| 2,607,320 A | * | 8/1952 | Ashbaugh | 119/781 |
| 2,981,230 A | * | 4/1961 | Putnam | 119/780 |
| 4,620,506 A | * | 11/1986 | Stubbs | 119/780 |
| 4,738,222 A | * | 4/1988 | Terry et al. | 119/781 |
| 6,612,263 B2 | * | 9/2003 | Scheid et al. | 119/787 |
| 2005/0034353 A1 | * | 2/2005 | Gustlin | 43/24 |

* cited by examiner

*Primary Examiner* — Rob Swiatek
*Assistant Examiner* — Kristen C Hayes
(74) *Attorney, Agent, or Firm* — Michael D. Eisenberg (57) ABSTRACT

A pet tether apparatus is described, comprising a stake assembly configured to receive a tether. The stake assembly has a tether attachment piece configured to rotate around a vertical axis of the stake assembly. A flexible rod having a first end and a second end, is attached to the tether attachment piece at its first end. A tether feeding top assembly is attached to the flexible rod at the second end of the rod and is configured for connection to a pulley for feeding of a tether. The pet tether apparatus is configured for attachment of a tether to the stake assembly and conduction of the tether through the tether feeding top assembly so that a user may attach the tether to the collar of a pet so as to confine the pet to a predetermined area while minimizing the risk of entanglement of the tether. Other variants are described.

12 Claims, 11 Drawing Sheets

PET TETHER APPARATUS

TECHNICAL FIELD

The present invention relates to a pet tether apparatus, and more particularly, some embodiments relate to a device for using a tether to confine a pet to a predetermined area while minimizing the risk of entanglement of the tether.

BACKGROUND OF THE INVENTION

The subject invention generally relates to a pet tether apparatus, and more particularly, some embodiments relate to a device for using a tether to confine a dog to a predetermined area while minimizing the risk of entanglement of the tether. At various times, dog owners may be required to restrain their dog while they do other activities. This often requires the use of a tether or leash tied to an immovable object. Many dogs by nature are active and through their motions may tangle the leash around the object to which it is affixed or generate knots that reduce the length of the leash. The present invention addresses these potential hazards. The present invention is applicable to any animal for which there is a need to restrain the animal.

BRIEF SUMMARY OF EMBODIMENTS OF THE INVENTION

According to one embodiment of the invention, a pet tether apparatus is disclosed, which comprises a stake assembly configured to receive a tether, which stake assembly comprises a tether attachment piece configured to rotate around a vertical axis of the stake assembly. In addition, the pet tether apparatus comprises a flexible rod having a first end and a second end, the rod attached to the tether attachment piece at its first end. A tether feeding assembly is attached to a flexible rod at the second end of the rod and configured for connection to a pulley for feeding of a tether. The pet tether apparatus is configured for attachment of a tether to the stake assembly and conduction of the tether through the tether feeding top assembly so that a user may attach the tether to the collar of a pet. In this way, the user may confine the pet to a predetermined area while minimizing the risk of entanglement of the tether.

In a variant of the pet tether apparatus, the stake assembly further comprises a horizontal anchoring plate.

In another variant of the pet tether apparatus, the horizontal anchoring plate comprises a circular disk with two pointed members protruding therefrom. The two pointed members help anchor the plate when a user places the stake assembly into the ground in order to stabilize the plate.

In a further variant of the invention, the pointed members are disposed on opposite sides of the plate.

In yet a further variant, the pointed members comprise a planar surface configured to prevent rotation of the stake assembly about the stake when placed in the ground.

According to one embodiment of the pet tether apparatus, the stake assembly comprises a hortizonal anchoring plate, a vertical stake slidably mounted through the anchoring plate, and the tether attachment piece. The tether attachment piece further comprises a stake connection unit having a passageway, a rod connection unit configured to connect to the flexible rod, and a base connected to and below stake and rod connection units, the base having an opening leading to the passageway configured to receive the vertical stake. The tether attachment piece is rotatable around the vertical stake.

In a further embodiment of the pet tether apparatus, the stake assembly further comprises a groove for receiving a tether end piece.

In another embodiment of the pet tether apparatus, the base comprises a curved back end and a front end. The stake connection unit is connected to the base at the back end and the rod connection unit is connected to the base at the front end. The groove is disposed below the stake connection unit on the curved back end of the base.

In yet another embodiment of the pet tether apparatus, the tether end piece comprises a loop.

In another variant, the pet tether apparatus further comprises a planar connecting piece disposed between and connecting the stake connection unit and the rod connection unit.

In a further variant of the pet tether apparatus, the rod connection unit is configured to be connected to the rod at an acute angle with the anchoring plate. In yet a further variant, the acute angle is about 60 degrees.

According to another embodiment of the pet tether apparatus, the tether feeding top assembly further comprises a pulley for receiving a tether and feeding the tether through the tether feeding top assembly. The tether can pull and bend the flexible rod via the tether feeding top assembly.

In an additional embodiment, the pet tether apparatus further comprises a groove disposed in the stake assembly and a tether having a loop disposed at the first end. The loop is configured to sit in the groove, and the tether is positioned through the tether feeding top assembly at a second end of the tether.

In a further embodiment of the pet tether apparatus, the tether feeding top assembly further comprises a rod connecting end for connecting the tether feeding top assembly to the flexible rod. The tether feeding top assembly also comprises a tether connecting end for connecting a tether and feeding the tether through the tether feeding top assembly. The tether can pull and bend the flexible rod via the tether feeding top assembly.

In an additional embodiment of the pet tether apparatus, the tether feeding top assembly further comprises a pulley disposed in the tether connecting end.

In a further embodiment, the tether connecting end comprises a J shaped member, comprising a shaft portion and a pair of parallel disks connected to the shaft portion having a through hole disposed in each disk. The through holes are in alignment and configured to connect the pulley to the tether receiving end. The pulley is rotatably connected with the J shaped member between the parallel disks.

In a variant of the disclosed invention, a pet tether apparatus comprises a stake assembly configured to receive a tether end. The stake assembly comprises a horizontal anchoring plate comprising a circular disk with two pointed members protruding from the plate disposed on opposite sides of the plate. The pointed members comprise a planar surface configured to prevent rotation of the stake assembly about the stake when placed in the ground, wherein the pointed members help anchor the plate when a user places the stake assembly into the ground in order to stabilize the plate. The stake assembly also comprises a vertical stake slidably mounted through the anchoring plate, and a tether attachment piece. The tether attachment piece comprises a stake connection unit having a passageway; a rod connection unit configured to connect to the flexible rod at an acute angle with the anchoring plate; and a base connected to and below stake and rod connection units. The base has an opening leading to the passageway configured to receive the vertical stake, and the base comprises a curved back end and a front end, the stake connection unit connected to the base at the back end and the rod connection unit connected to the base at the front end, and a groove disposed below the stake connection unit on the curved back end of the base, the groove configured to receive a loop end of a tether. The tether attachment piece is rotatable about the vertical stake. The pet tether apparatus also comprises a flexible rod having a first end and a second end, the rod attached to the rod connection unit at its first end and a tether feeding top assembly for feeding of a tether. The tether feeding top assembly comprises a rod connecting end for connecting the tether feeding top assembly to the flexible rod; and a tether receiving end. The tether receiving end comprises a J shaped member, comprising: a shaft portion; a pulley; and a pair of parallel disks connected to the shaft portion having a through hole disposed in each disk. The through holes are in alignment and configured to connect the pulley to the tether receiving end, and the pulley is rotatably connected with the J shaped member between the parallel disks. The tether can pull and bend the flexible rod via the tether feeding top assembly. In addition, the pet tether apparatus is configured for attachment of a tether to the stake assembly and conduction of the tether through the tether feeding top assembly so that a user may attach the tether to the collar of a pet. The user may therefore confine the pet to a predetermined area while minimizing the risk of entanglement of the tether.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention is directed toward a pet tether apparatus that is configured to enable to user to confine a pet to a predetermined area while minimizing the risk of entanglement of the tether. According to one embodiment of the invention, referring to FIGS. 1-3, a pet tether apparatus 10 is disclosed, which comprises a stake assembly 15 configured to receive a tether 40, which stake assembly 15 comprises a tether attachment piece 20 configured to rotate around a vertical axis of the stake assembly 15. In addition, the pet tether apparatus comprises a flexible rod 25 having a first end 32 and a second end 35, the rod 25 attached to the tether attachment piece at its first end 32. A tether feeding top assembly 30 is attached to the flexible rod 25 at the second end 35 of the rod and configured for connection to a pulley 125 for feeding of a tether. The pet tether apparatus is configured for attachment of the tether 40 to the stake assembly 15 and conduction of the tether through the tether feeding top assembly 30 so that a user may attach the tether to the collar of a pet (not shown). In this way, the user may confine the pet to a predetermined area while minimizing the risk of entanglement of the tether.

Figure 1:
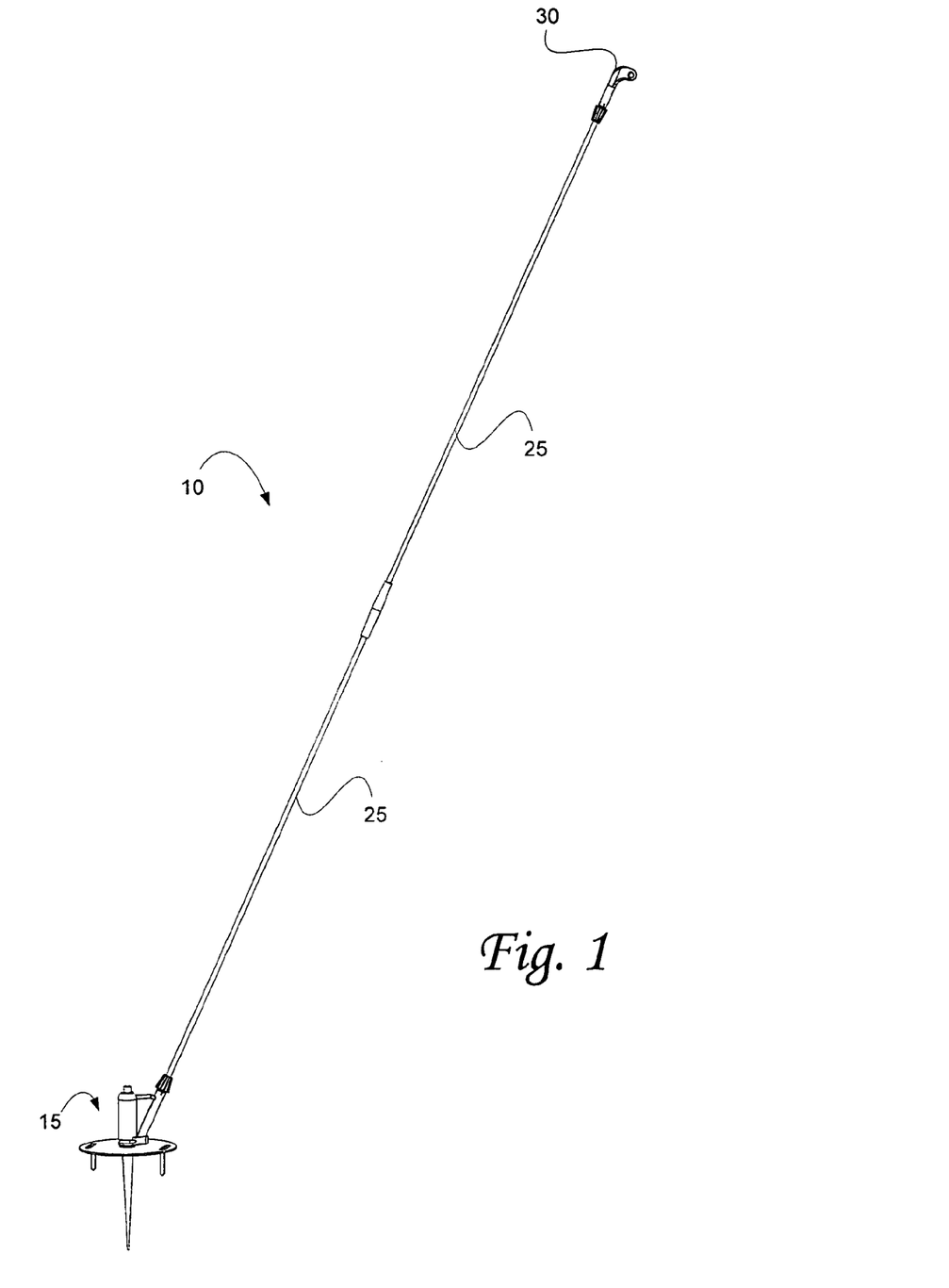
FIG. 1 is perspective view of a preferred pet tether apparatus.
Figure 2:
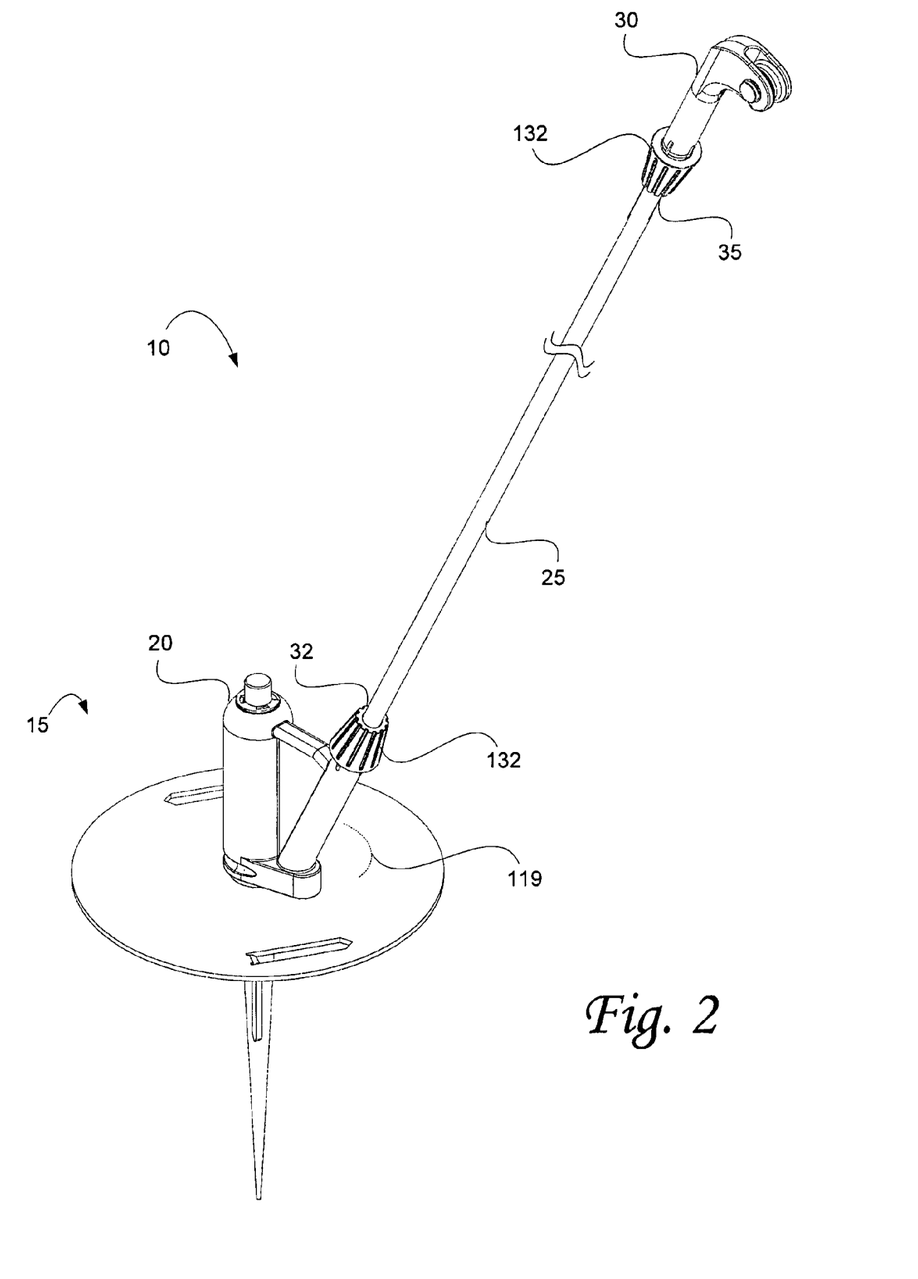
FIG. 2 is a perspective view of a preferred pet tether apparatus with the rod truncated for illustrative purposes.

FIG. 1 illustrates a preferred embodiment of the invention, wherein the rod 25 comprises two sections connected together. In FIG. 2, the rod has been truncated for illustrative purposes and in FIG. 3, the apparatus is illustrated having a tether 42.

In a variant of the pet tether apparatus, referring to FIGS. 4-7, the stake assembly 15 comprises a horizontal anchoring plate 45.

In another variant of the pet tether apparatus, the horizontal anchoring plate 45 comprises a circular disk 48 with two pointed members 55 protruding therefrom. The two pointed members 55 help anchor the plate when a user places the stake assembly into the ground in order to stabilize the plate.

In a further variant of the invention, the pointed members 55 are disposed on opposite sides of the plate.

In yet a further variant, the pointed members comprise a planar surface 58 configured to prevent rotation of the stake assembly about the stake when placed in the ground.

According to one embodiment of the pet tether apparatus, referring to FIGS. 4-11, the stake assembly comprises a hortizonal anchoring plate 45 and a vertical stake 50 slidably mounted through the anchoring plate 45. The vertical stake comprises a ground penetrating portion 70 and a top protruding portion 65. The anchoring plate 45 comprises a hole 60 for receiving the vertical stake 50. The anchoring plate 45 is positioned between the ground penetrating portion 70 and the top protruding portion 65 of the vertical stake 50.

Figure 9:
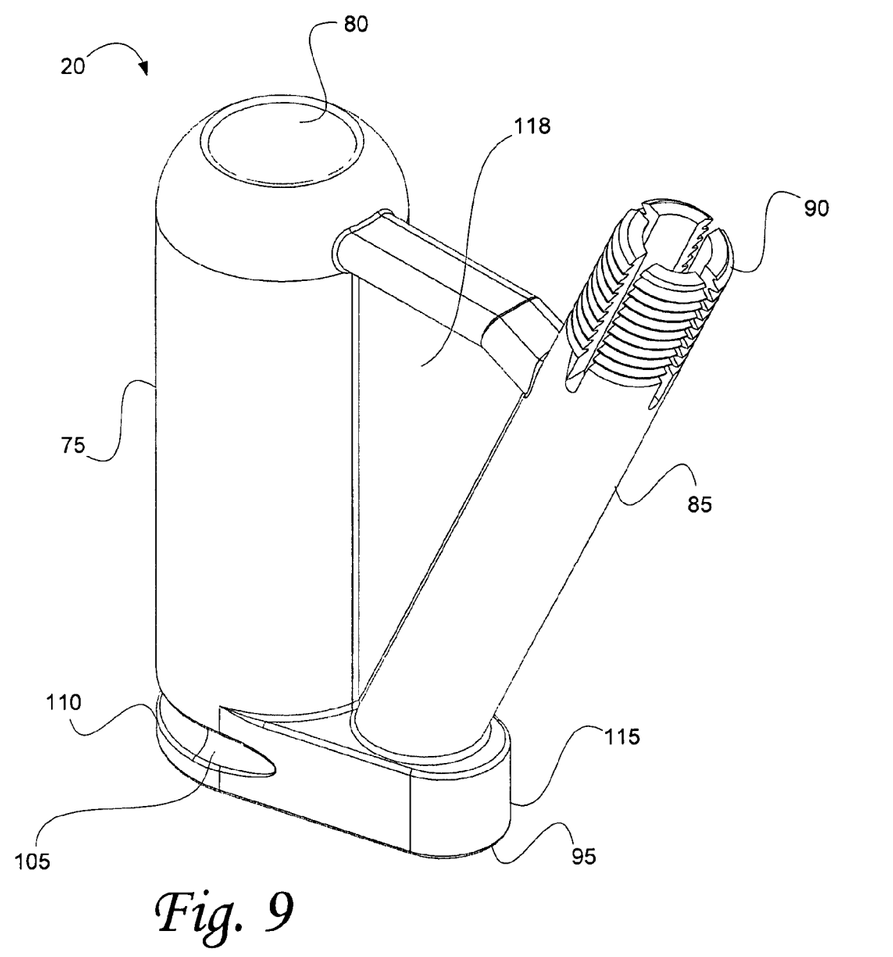
FIG. 9 is perspective view of a tether attachment piece.
Figures 10, 11:
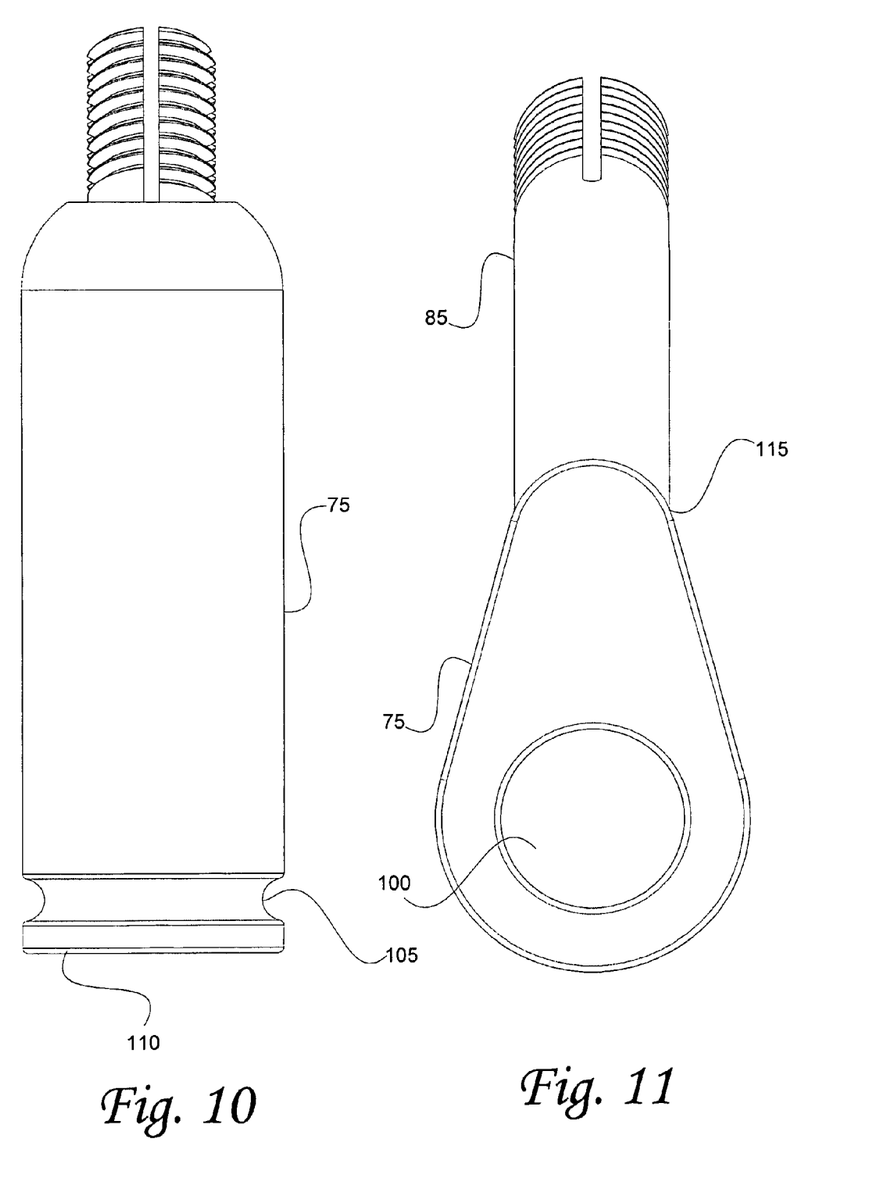
FIG. 10 is a back view of a tether attachment piece.
FIG. 11 is a bottom view of a tether attachment piece.

The stake assembly comprises a tether attachment piece 20. The tether attachment piece 20 has a stake connection unit 75 having a passageway 80, a rod connection unit 85 configured to connect to the flexible rod 25 via a threaded end 90, and a base 95 connected to and below stake 75 and rod 85 connection units, the base 95 having an opening 100 leading to the passageway 80 configured to receive the top protruding portion 65 of the vertical stake 50. The tether attachment piece 20 is rotatable around the top protruding portion 65 of the vertical stake 50.

Figure 3:
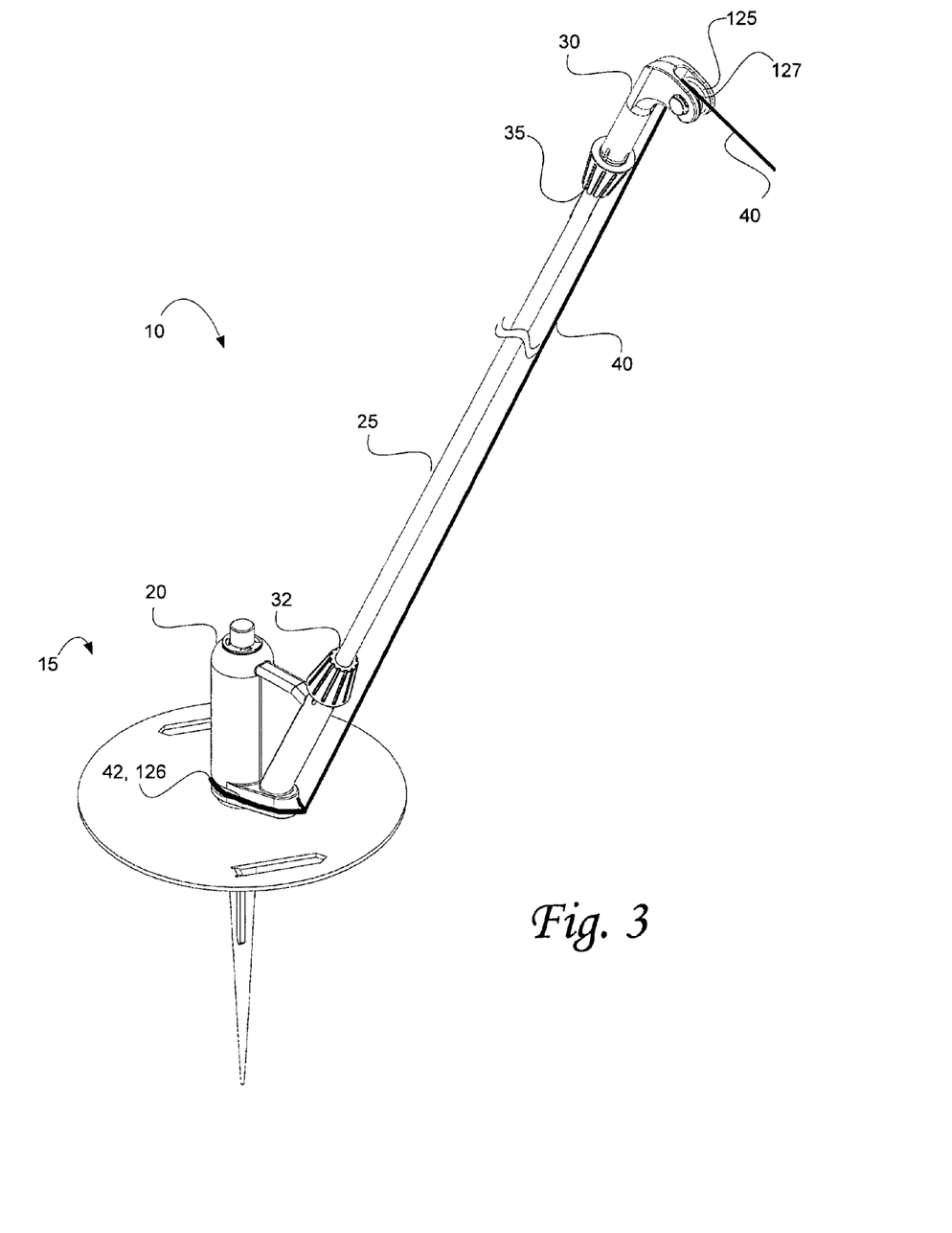
FIG. 3 is perspective view of a preferred pet tether apparatus illustrating placement of the tether.
Figure 4:
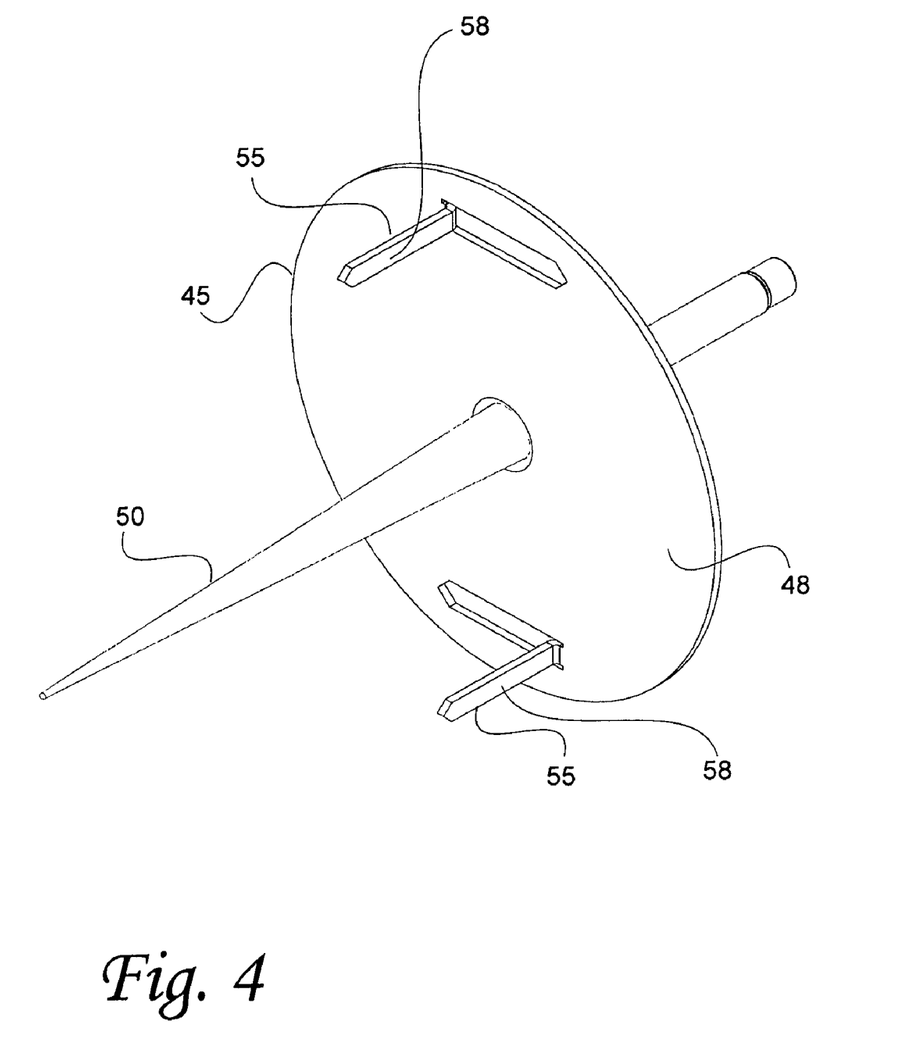
FIG. 4 is perspective view of an anchor plate and vertical stake.
Figures 5, 6:
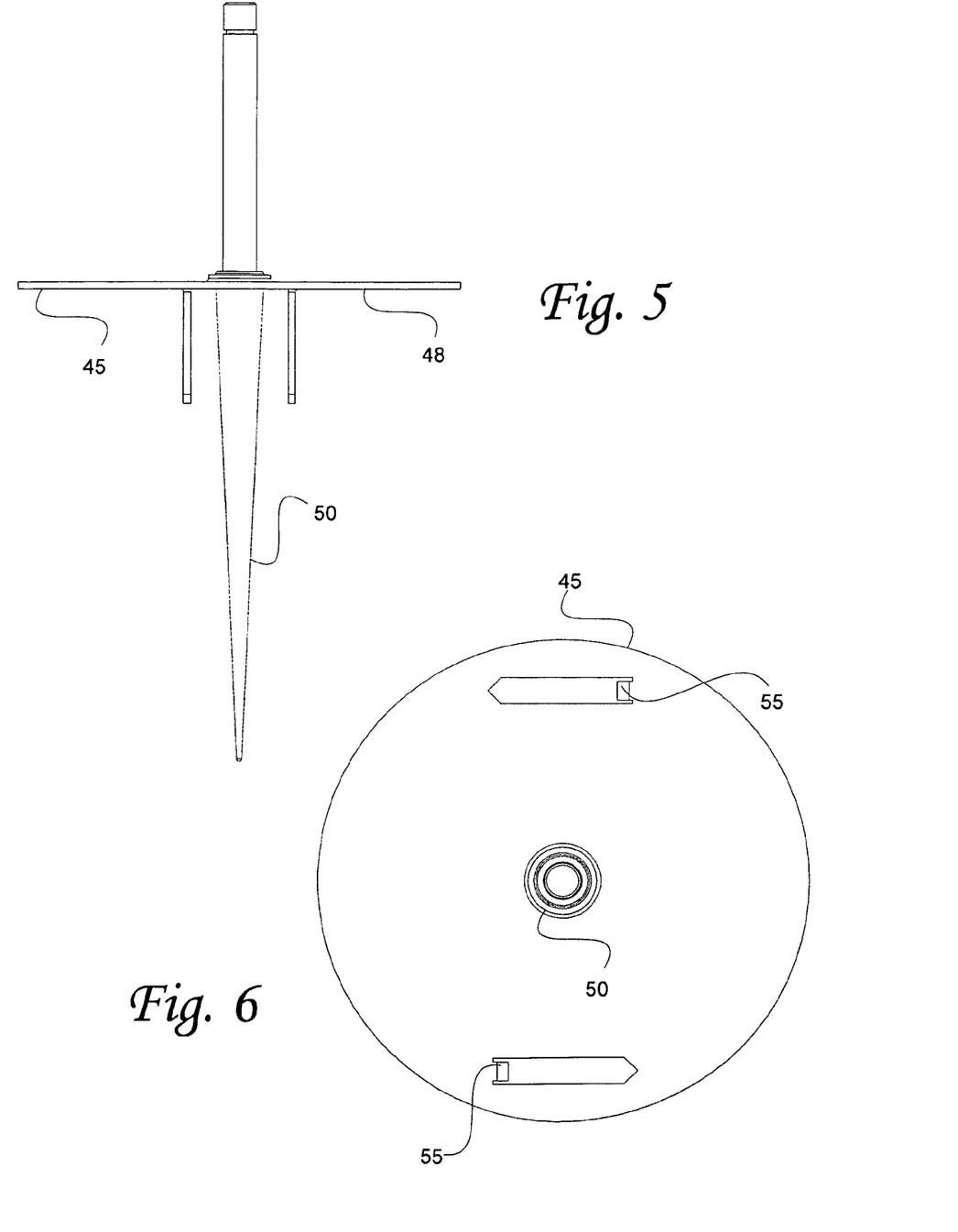
FIG. 5 is side view of an anchor plate and vertical stake.
FIG. 6 is top view of an anchor plate and vertical stake.
Figure 7:
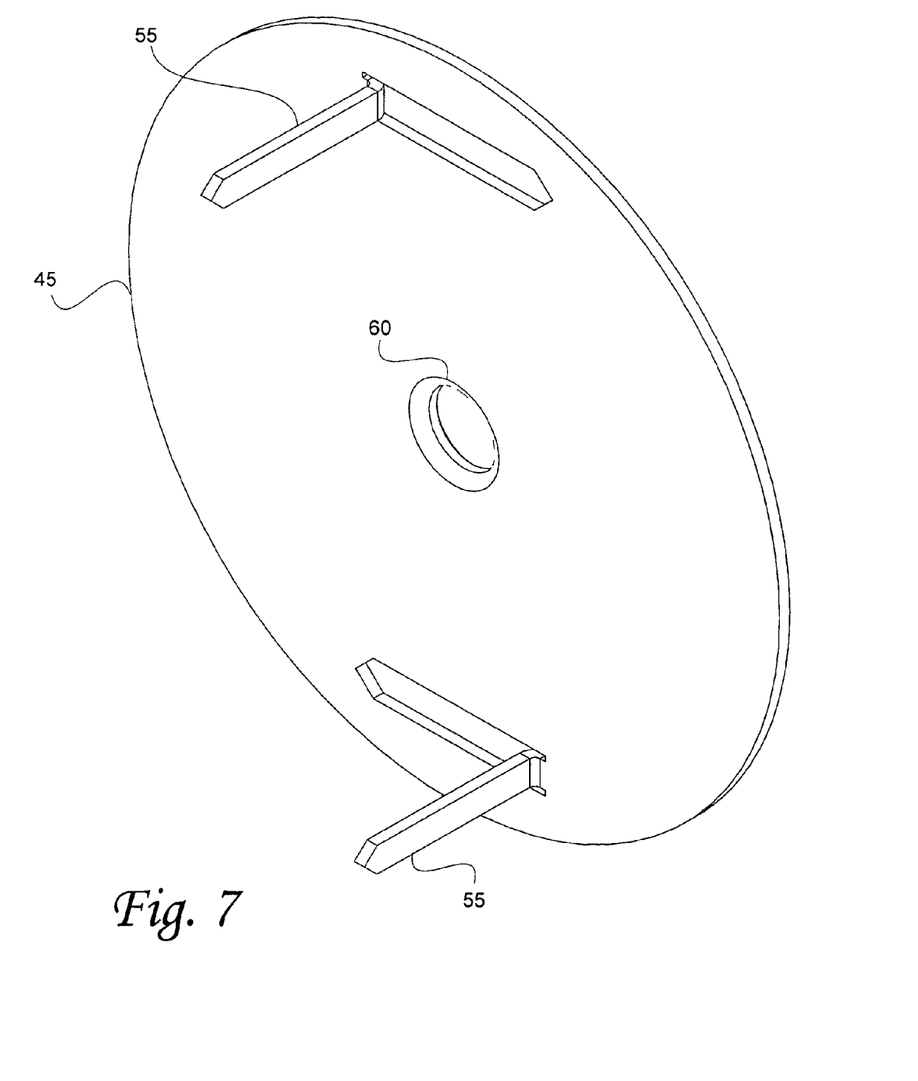
FIG. 7 is perspective view of an anchor plate.
Figure 8:
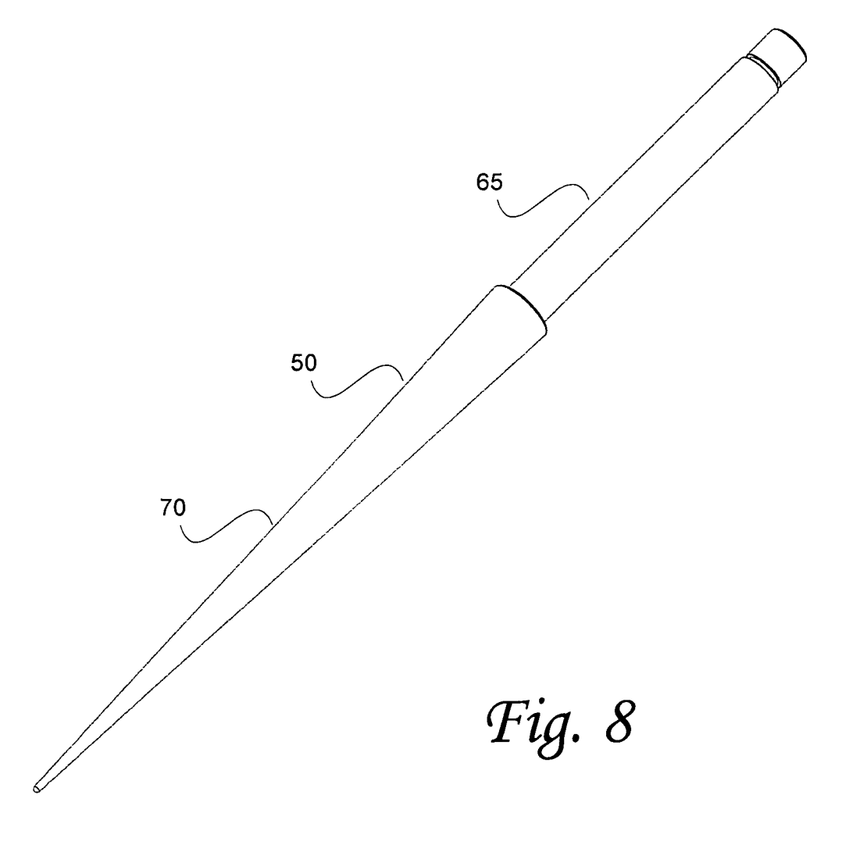
FIG. 8 is perspective view of a vertical stake.

In a further embodiment of the pet tether apparatus, the stake assembly further comprises a groove 105 for receiving a tether end piece 42 (see FIG. 3).

In another embodiment of the pet tether apparatus, the base comprises a curved back end 110 and a front end 115. The stake connection unit 75 is connected to the base 95 at the back end 110 and the rod connection unit 85 is connected to the base 95 at the front end 115. The groove 105 is disposed below the stake connection unit 75 on the curved back 110 end of the base.

In yet another embodiment of the pet tether apparatus, the tether end piece 42 comprises a loop.

In another variant, the pet tether apparatus further comprises a planar connecting piece 118 disposed between and connecting the stake connection unit 75 and the rod connection unit 85.

In a further variant of the pet tether apparatus, the rod connection unit 85 is configured to be connected to the rod 25 at an acute angle 119 with the anchoring plate 45 (see FIG. 2). In yet a further variant, the acute angle is about 60 degrees.

Figure 13:
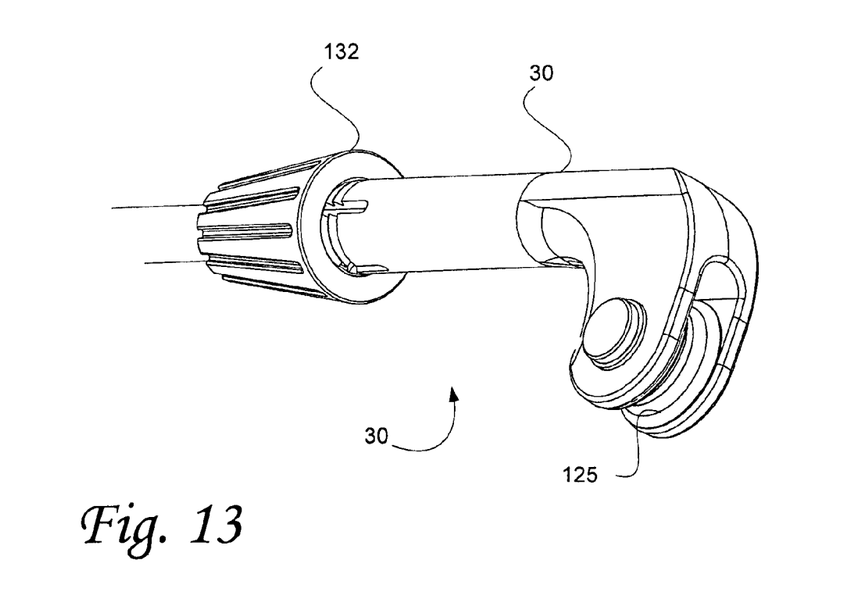
FIG. 13 is a perspective view of a tether feeding top assembly having a pulley.

According to another embodiment of the pet tether apparatus, referring to FIGS. 3 and 13, the tether feeding top assembly 30 further comprises a pulley 125 for receiving a tether 40 and feeding the tether 40 through the tether feeding top assembly 30. The tether can pull and bend the flexible rod 25 via the tether feeding top assembly.

In an additional embodiment, referring to FIGS. 3 and 9-13, the pet tether apparatus further comprises a groove 105 disposed in the stake assembly and a tether 40 having a loop disposed at the first end 126. The loop is configured to sit in the groove 105, and the tether is positioned through the tether feeding top assembly 30 at a second end 127 of the tether 40.

Figure 12:
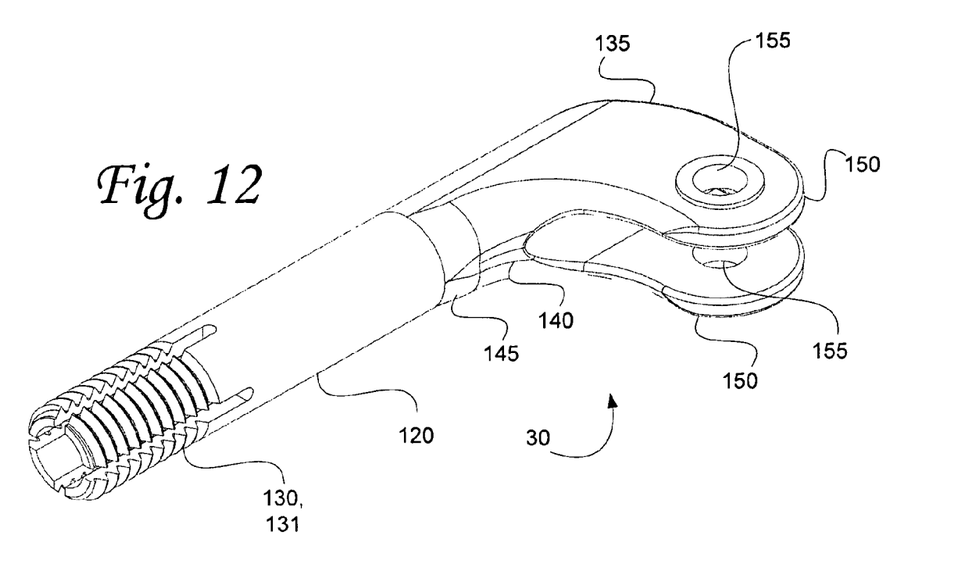
FIG. 12 is a perspective view of a tether feeding top assembly.
Figure 14:
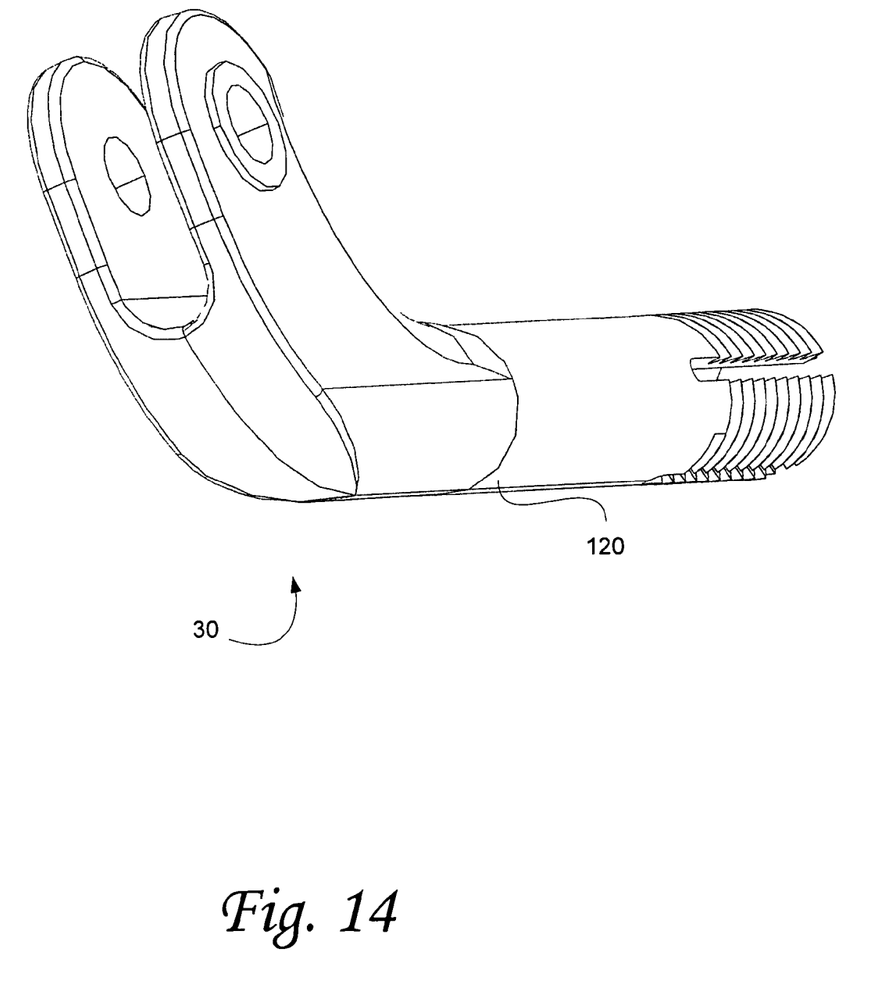
FIG. 14 is a top perspective view of a tether feeding top assembly.

In a further embodiment of the pet tether apparatus, referring to FIGS. 12-14, the tether feeding top assembly 30 further comprises a rod connecting end 130 for connecting the tether feeding top assembly 30 to the flexible rod 25. In one variant, the rod 25 may be connected to male threaded ends 90, 131 of the rod connection unit 85 and the rod connecting end 130 via female threaded members 132. The tether feeding top assembly 30 also comprises a tether receiving end 135 for connecting a tether 40 and feeding the tether 40 through the tether feeding top assembly 30. The tether can pull and bend the flexible rod via the tether feeding top assembly.

In an additional embodiment of the pet tether apparatus, referring to FIG. 14, the tether feeding top assembly further comprises a pulley 125 disposed in the tether connecting end 135.

In still a further embodiment, referring to FIGS. 12-14, the tether connecting end comprises a J shaped member 140, comprising a shaft portion 145 and a pair of parallel disks 150 connected to the shaft portion 145 having a through hole 155 disposed in each disk 150. The through holes 155 are in alignment and configured to connect the pulley 125 to the tether receiving end 135. The pulley 125 is rotatably connected with the J shaped member 140 between the parallel disks 150.

In a variant of the disclosed invention, referring to FIGS. 1-14, a pet tether apparatus 10 comprises a stake assembly 15 configured to receive a tether end 42. The stake assembly 15 comprises a horizontal anchoring plate 45 comprising a circular disk 48 with two pointed members 55 protruding from the plate disposed on opposite sides of the plate. The pointed members 55 comprise a planar surface 58 configured to prevent rotation of the stake assembly about the stake when placed in the ground. The pointed members 55 help anchor the plate 45 when a user places the stake assembly into the ground in order to stabilize the plate. The stake assembly 15 also comprises a vertical stake 50 slidably mounted through the anchoring plate 45, and a tether attachment piece 20. The tether attachment piece 20 comprises a stake connection unit 75 having a passageway 80, a rod connection unit 85 configured to connect to the flexible rod 25 at an acute angle 119 with the anchoring plate 45, and a base 95 connected to and below stake and rod connection units 75, 85. The base 95 has an opening 100 leading to the passageway 80 configured to receive the vertical stake 50, and the base 95 comprises a curved back end 110 and a front end 115. The stake connection unit 75 is connected to the base 95 at the back end 110 and the rod connection unit 85 is connected to the base 95 at the front end 115. A groove 105 is disposed below the stake connection unit 75 on the curved back end 110 of the base 95. The groove 105 is configured to receive a loop end 42 of a tether 40. The tether attachment piece 20 is rotatable about the vertical stake 50. The pet tether apparatus 10 also comprises a flexible rod 25 having a first end 32 and a second end 35. The rod 25 is attached to the rod connection unit 85 at its first end 32 and a tether feeding top assembly 30 for feeding of a tether 40. The tether feeding top assembly 30 comprises a rod connecting end 120 for connecting the tether feeding top assembly 30 to the flexible rod 25 and a tether connecting end 135. The tether receiving end 135 comprises a J shaped member 140, comprising: a shaft portion 145; a pulley 125; and a pair of parallel disks 150 connected to the shaft portion 145 having a through hole 155 disposed in each disk 150. The through holes 155 are in alignment and configured to connect the pulley 125 to the tether receiving end 135, and the pulley 125 is rotatably connected with the J shaped member 140 between the parallel disks 150. The tether 40 can pull and bend the flexible rod 40 via the tether feeding top assembly 30. In addition, the pet tether apparatus 10 is configured for attachment of a tether 40 to the stake assembly 15 and conduction of the tether through the tether feeding top assembly 30 so that a user may attach the tether 40 to the collar of a pet. The user may therefore confine the pet to a predetermined area while minimizing the risk of entanglement of the tether.

While various embodiments of the present invention have been described above, it should be understood that they have been presented by way of example only, and not of limitation Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A pet tether apparatus comprising:
    a stake assembly configured to receive a tether end, comprising:
        a tether attachment piece configured to rotate around a vertical axis of the stake assembly;
        a horizontal anchoring plate;
        a groove for receiving a tether end piece;
        a vertical stake slidably mounted through the anchoring plate; and
        the tether attachment piece further comprises:
            a stake connection unit having a passageway;
            a rod connection unit configured to connect to a flexible rod; and
            a base connected to and below stake and rod connection units, the base having an opening leading to the passageway configured to receive the vertical stake, the base comprising a curved back end and a front end, the stake connection unit connected to the base at the back end and the rod connection unit connected to the base at the front end; and the groove is disposed below the stake connection unit on the curved back end of the base; wherein the tether attachment piece is rotatable about the vertical stake;
    a flexible rod having a first end and a second end, the rod attached to the tether attachment piece at its first end; and
    a tether feeding top assembly attached to the flexible rod at the second end of the rod and configured for connection to a pulley for feeding of a tether;
    wherein the pet tether apparatus is configured for attachment of a tether to the stake assembly and conduction of the tether through the tether feeding top assembly so that a user may attach the tether to the collar of a pet so as to confine the pet to a predetermined area while minimizing the risk of entanglement of the tether.

2. The pet tether apparatus of claim 1, wherein the stake assembly further comprises a horizontal anchoring plate.

3. The pet tether apparatus of claim 2, wherein the horizontal anchoring plate comprises a circular disk with two pointed members protruding therefrom which help anchor the plate when a user places the stake assembly into the ground in order to stabilize the plate.

4. The pet tether apparatus of claim 3, wherein the pointed members are disposed on opposite sides of the plate.

5. The pet tether apparatus of claim 4, wherein the pointed members comprise a planar surface configured to prevent rotation of the stake assembly about the stake when placed in the ground.

6. The pet tether apparatus of claim 1, wherein the tether end piece comprises a loop.

7. The pet tether apparatus of claim 1, further comprising a planar connecting piece disposed between and connecting the stake connection unit and the rod connection unit.

8. The pet tether apparatus of claim 7, wherein the acute angle is about 60 degrees.

9. The pet tether apparatus of claim 1, wherein the rod connection unit is configured to be connected to the rod at an acute angle with the anchoring plate.

10. The pet tether apparatus of claim 1, wherein the tether feeding top assembly further comprises a pulley for receiving a tether and feeding the tether through the tether feeding top assembly; and
   wherein the tether can pull and bend the flexible rod via the tether feeding top assembly.

11. A pet tether apparatus comprising:
   a stake assembly configured to receive a tether end, comprising:
      a tether attachment piece configured to rotate around a vertical axis of the stake assembly;
      a groove disposed in the stake assembly; and
      a tether having a loop disposed at a first end, the loop configured to sit in the groove, the tether positioned through the tether feeding top assembly at a second end of the tether;
   a flexible rod having a first end and a second end, the rod attached to the tether attachment piece at its first end; and
   a tether feeding top assembly attached to the flexible rod at the second end of the rod and configured for connection to a pulley for feeding of a tether;
   wherein the pet tether apparatus is configured for attachment of a tether to the stake assembly and conduction of the tether through the tether feeding top assembly so that a user may attach the tether to the collar of a pet so as to confine the pet to a predetermined area while minimizing the risk of entanglement of the tether.

12. A pet tether apparatus comprising:
   a stake assembly configured to receive a tether end, comprising:
      a tether attachment piece configured to rotate around a vertical axis of the stake assembly;
   a flexible rod having a first end and a second end, the rod attached to the tether attachment piece at its first end; and
   a tether feeding top assembly attached to the flexible rod at the second end of the rod and configured for connection to a pulley for feeding of a tether, comprising:
      a rod connecting end for connecting the tether feeding top assembly to the flexible rod;
      a tether connecting end for connecting a tether and feeding the tether through the tether feeding top assembly, comprising:
         a J shaped member, comprising:
            a shaft portion; and
            a pair of parallel disks connected to the shaft portion having a through hole disposed in each disk, the through holes in alignment and configured to connect the pulley to the tether receiving end, the pulley rotatably connected with the J shaped member between the parallel disks; and
         a pulley disposed in the tether connecting end;
      wherein the tether can pull and bend the flexible rod via the tether feeding top assembly;
   wherein the pet tether apparatus is configured for attachment of a tether to the stake assembly and conduction of the tether through the tether feeding top assembly so that a user may attach the tether to the collar of a pet so as to confine the pet to a predetermined area while minimizing the risk of entanglement of the tether.

* * * * *